(12) United States Patent
Mijolovic et al.

(10) Patent No.: US 8,530,570 B2
(45) Date of Patent: Sep. 10, 2013

(54) USE OF 2-ISOPROPYL-2-ALKYL-1,3-PROPANEDIOLS FOR PREPARING POLYMERS

(75) Inventors: Darijo Mijolovic, Mannheim (DE); Sebastien Garnier, Weinheim (DE); Qiang Miao, Mannheim (DE); Maria Guixa Guardia, Mannheim (DE); Gerd-Dieter Tebben, Mannheim (DE)

(73) Assignee: BASF SE, Ludwigshafen (DE)

( * ) Notice: Subject to any disclaimer, the term of this patent is extended or adjusted under 35 U.S.C. 154(b) by 54 days.

(21) Appl. No.: 13/003,911

(22) PCT Filed: Jul. 21, 2009

(86) PCT No.: PCT/EP2009/059326
§ 371 (c)(1),
(2), (4) Date: Jan. 13, 2011

(87) PCT Pub. No.: WO2010/010075
PCT Pub. Date: Jan. 28, 2010

(65) Prior Publication Data
US 2011/0124809 A1 May 26, 2011

(30) Foreign Application Priority Data
Jul. 23, 2008 (EP) .................... 08160996

(51) Int. Cl.
*C08G 18/08* (2006.01)
*C08G 64/00* (2006.01)
*C08G 65/34* (2006.01)
*C08G 67/02* (2006.01)

(52) U.S. Cl.
USPC ............ 524/590; 524/612; 528/370; 528/425

(58) Field of Classification Search
USPC ................................. 524/590, 612
See application file for complete search history.

(56) References Cited

U.S. PATENT DOCUMENTS

| | | | |
|---|---|---|---|
| 3,975,450 A | | 8/1976 | Palmer et al. |
| 4,058,506 A | * | 11/1977 | Vaeth et al. ............. 528/65 |
| 4,317,945 A | | 3/1982 | Bernhagen et al. |
| 5,620,751 A | * | 4/1997 | Brindoepke et al. .......... 427/506 |
| 7,112,693 B2 | * | 9/2006 | Tillack et al. ............. 558/276 |
| 2002/0098344 A1 | * | 7/2002 | Mizuno et al. ............. 428/334 |
| 2005/0038224 A1 | * | 2/2005 | Murayama et al. ........... 528/270 |

FOREIGN PATENT DOCUMENTS

| | | |
|---|---|---|
| EP | 0 044 412 | 1/1982 |
| EP | 0 044 444 | 1/1982 |
| EP | 0 487 035 | 5/1992 |
| EP | 0 562 578 | 9/1993 |
| EP | 1 131 372 | 9/2001 |
| GB | 1 009 915 | 11/1965 |
| JP | 3-161452 | 7/1991 |
| JP | 03 161452 | 7/1991 |
| JP | 2000336140 A * | 12/2000 |
| WO | 97 17313 | 5/1997 |
| WO | 98 29374 | 7/1998 |
| WO | 00 23495 | 4/2000 |
| WO | 01 51438 | 7/2001 |

OTHER PUBLICATIONS

International Search Report issued Sep. 8, 2009 in PCT/EP09/059326 filed Jul. 21, 2009.
U.S. Appl. No. 12/997,805, filed Dec. 13, 2010, Mijolovic, et al.
U.S. Appl. No. 13/159,761, filed Jun. 14, 2011, Rohde, et al.
U.S. Appl. No. 13/058,021, filed Feb. 8, 2011, Mijolovic, et al.
U.S. Appl. No. 13/061,743, filed Mar. 2, 2011, Mijolovic, et al.
Ya. M. Slobodin, et al., "Synthesis of 1.1-Dialkylcyclopropanes from Aldehydes", Journal of General Chemistry of the USSR, vol. 23, XP 9122044, Oct. 1953, pp. 1747-1749.
Office Action in Japanese corresponding application No. 2011-519142, mailed Mar. 6, 2013.

* cited by examiner

*Primary Examiner* — Ling-siu Choi
*Assistant Examiner* — Aiqun Li
(74) *Attorney, Agent, or Firm* — Oblon, Spivak, McClelland, Maier & Neustadt, L.L.P.

(57) ABSTRACT

Polymer obtainable by polycondensation or polyadduct formation from monomeric compounds, wherein accompanying use is made as monomeric compound of 2-isopropyl-2-alkyl-1,3-propanediols of the formula I

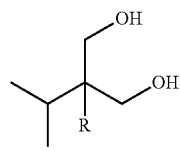

or alkoxylated derivatives thereof.

13 Claims, No Drawings

USE OF 2-ISOPROPYL-2-ALKYL-1,3-PROPANEDIOLS FOR PREPARING POLYMERS

CROSS-REFERENCE TO RELATED APPLICATIONS

This application is the U.S. national stage of international application PCT/EP2009/059326, filed on Jul. 21, 2009, the text of which is incorporated by reference, and claims priority to European Patent Application No. 08160996.8, filed on Jul. 23, 2008, the text of which is also incorporated by reference.

The invention relates to a polymer which is obtainable by polycondensation or polyadduct formation from monomeric compounds, wherein accompanying use is made as monomeric compound of 2-isopropyl-2-alkyl-1,3-propanediols of the formula I

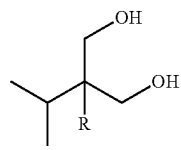

I or the alkoxylated derivatives thereof.

Diols are needed for the preparation of polymers, examples being polyesters or polyurethanes. In EP-A 562 578, for example, the use of various cyclohexanediols such as 1,4-cyclohexanedimethanol or 1,4-cyclohexanediethanol in the preparation of polyesters is described.

The use of 2-pentyl-2-propyl-1,3-propanediol for the preparation of polyesters is known from JP HEI 03-161452.

There is a fundamental desire to improve the performance properties of polymers in the context of their various uses.

When the polymers are used as binders in coating materials, adhesives or sealants, the viscosity is of particular importance, whether as the melt viscosity (100% systems) or the solution viscosity (polymer solutions). For film-forming applications, the coatings produced are to have good mechanical properties, such as impact toughness and elasticity, high scratch resistance and impact resistance, high resistances to water, solvents, grease and chemicals and environmental influences and also a high gloss.

It was an object of the present invention to provide such polymers.

This object is achieved by means of a polymer obtainable by polycondensation or polyadduct formation from monomeric compounds, wherein use is made as monomeric compound of 2-isopropyl-2-alkyl-1,3-propanediols of the formula I

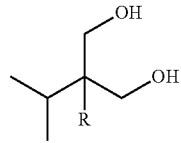

I or the alkoxylated derivatives thereof, where R is a linear or branched alkyl radical having 1 to 20 C atoms.

Advantageously, in the polymer of the invention, use is made as monomeric compound or its alkoxylated derivatives of the formula I of those for which R is methyl or 3-methylbutyl.

Advantageously, in the polymer of the invention, the compounds of the formula I are obtainable by reacting 3-methyl-2-alkylbutanal with formaldehyde in an aldol-Cannizarro reaction or by aldol reaction and subsequent hydrogenation.

Advantageously, in the polymer of the invention, the polymer is a polyester.

Advantageously, in the polymer of the invention, the polymer is a polycarbonatediol which is obtainable by reacting dialkyl carbonates or cyclic carbonates with diols, with elimination of alcohol.

Advantageously, in the polymer of the invention, the polymer is a polyurethane.

Advantageously, in the polymer of the invention, the polymer is a polyadduct which is obtainable by ring-opening addition polymerization of lactones or lactams.

The invention further provides for the use of the polymer of the invention for preparing a thermoplastic composition.

The invention further provides a thermoplastic composition comprising a polymer of the invention and/or repeat units of a polymer of the invention.

The invention further provides for the use of the thermoplastic compositions of the invention for producing shaped articles.

The invention further provides for the use of the polymer of the invention for preparing coating materials, sealants or adhesives.

The invention further provides coating materials, sealants or adhesives comprising repeat units of the polymer of the invention.

The coating materials, sealants or adhesives of the invention advantageously comprise aqueous materials.

The invention further provides for the use of a polymer of the invention for producing powder coating materials.

The invention further provides a powder coating material comprising repeat units of the polymer of the invention.

The invention further provides for the use of the polymer of the invention for producing radiation-curable coating materials.

The invention further provides a radiation-curable coating material comprising repeat units of a polymer of the invention.

The polymers of the invention are prepared using compounds of the formula I or the alkoxylated derivatives thereof in which R is a linear or branched alkyl radical having 1 to 10 C atoms. Preferably R is selected from the group consisting of methyl, ethyl, propyl, isopropyl, n-butyl, 1-methylbutyl, 2-methylbutyl, 3-methylbutyl, and tert-butyl. Particular preference is given to methyl or 3-methylbutyl.

The alkoxylated derivatives of the compound of the general formula I are products of the reaction with one or with a mixture of alkylene oxides. Examples of alkylene oxides are ethylene, propylene, n-butylene, isobutylene, styrene or cyclohexene oxides. More particularly the aforementioned diols are ethoxylated and propoxylated. The alkoxylation products are obtainable in a known way by reaction of the above alcohols with alkylene oxides, especially ethylene oxide or propylene oxide. The degree of alkoxylation per hydroxyl group is preferably 0 to 20, more particularly 0 to 10, i.e., 1 mol of hydroxyl group may be alkoxylated preferably with up to 20 mol, more particularly 10 mol, of alkylene oxides.

In one preferred embodiment the compounds of the formula I are not alkoxylated.

The compounds of the formula I are obtained by a Cannizzaro reaction of the corresponding 3-methyl-2-alkylbutanals with formaldehyde. The process for preparing such 1,3-propanediol derivatives is already known and is described in GB 1009915 or U.S. Pat. No. 3,975,450. The 1,3-propanediols may alternatively be obtained by aldol reaction of the corresponding 3-methyl-2-alkylbutanals with formaldehyde to give the corresponding 2-hydroxymethyl-3-methyl-2-alkylbutanals, and subsequent hydrogenation of the latter. The aldol reaction is described, for example, in WO 01/51438, WO 97/17313 or WO 98/29374. The hydrogenation can be carried out by analogy with the disclosure in EP-A 44412 or EP-A 44444. For the preparation of 2-isopropyl-2-(3-methylbutyl)-1,3-propanediol, the corresponding 3-methyl-2-alkylbutanal is prepared by homo-aldol condensation of isovaleraldehyde and subsequently selective hydrogenation of the double bond, as described in EP-A 487035 (pages 2 to 5).

The Polymers

The polymers are obtainable by polycondensation or polyadduct formation from monomeric compounds with accompanying use of one or more compounds of the formula I; the polymers can, if desired, be chemically modified—for example, functionalized or crosslinked—by other or further reactions.

When monomeric compounds are subjected to polycondensation, there is elimination of water or alcohol; in the case of polyadduct formation there is no elimination.

Preferred polycondensates are polyesters, which are obtainable by reacting diols or polyols with dicarboxylic or polycarboxylic acids, which can also be used in the form of reactive derivatives, such as anhydrides or esters.

The term polyester is intended below to refer to a polymer which is composed to an extent of more than 50%, more preferably more than 70%, and more particularly more than 90% by weight of synthesis components selected from diols, polyols, dicarboxylic acids and polycarboxylic acids.

Mention may also be made of polycarbonatediols, which are obtainable by reacting dialkyl carbonates or cyclic carbonates with diols, with elimination of alcohols.

As a polyadduct, mention may be made in particular of polyurethane. In particular it is possible for polyurethanes also to comprise repeat units of polymers of the invention.

Also contemplated, for example, are polyadducts, which are obtainable by ring-opening addition polymerization of lactones or lactams.

The term polyurethane is intended below to refer to a polymer which is composed to an extent of more than 50%, more preferably more than 70%, and more particularly more than 90% by weight of synthesis components selected from diisocyanates, polyisocyanates, diols and polyols.

All of these polymers share the feature that they are synthesized substantially from diols and from compounds that are reactive with these diols, such as di- and/or polycarboxylic acids (polyesters) or di- and/or polyisocyanates (polyurethanes).

Preferred polymers are polyesters and polyurethanes; polyesters are particularly preferred.

The polymers of the invention preferably have the below-stated content of the monomer units of the compounds of the formula I or alkoxylated derivatives thereof. The below-stated weight figures relating to the amount of the compounds of the formula I or alkoxylated derivatives thereof in the polymer refer in this case to the units of the polymer that derive from compounds of the formula I or their alkoxylated compounds. In the case of polyadducts, the weight of these units corresponds directly to the compound of the formula I or alkoxylated derivatives thereof; in the case of polycondensates, the weight of these units is reduced in value by the weight of the hydrogen atoms of the hydroxyl groups.

Preferred polymers are composed to an extent of at least 0.5%, more preferably at least 2%, very preferably at least 5%, and more particularly at least 10% by weight and in one particular embodiment at least 20% by weight, of compounds of the formula I or their alkoxylated derivatives. Since the accompanying use of other compounds reactive with the diols is mandatory, the polymers are generally composed to an extent of not more than 90%, more particularly not more than 60%, or not more than 50%, by weight, of the compounds of the formula I or their alkoxylated derivatives.

Besides the compounds of the formula I or their alkoxylated derivatives, the polymers may also comprise other diols or polyols as synthesis components. In one preferred embodiment at least 10%, more preferably at least 25%, and very preferably at least 50% by weight of the diols and polyols of which the polymers are composed comprise the compounds of the formula I or their alkoxylated derivatives.

More particularly at least 70% by weight or at least 90% by weight of the diols and polyols, of which the polymers are composed may comprise the compounds of the formula I or their alkoxylated derivatives.

In one particular embodiment 100% by weight of all the diols and polyols of which the polymers are composed may comprise the compounds of the formula I or their alkoxylated derivatives.

Further Constituents of the Polyesters

Polyesters, besides the compounds of the formula I or their alkoxylated derivatives, may comprise further diols or polyols as synthesis components.

Examples of further diols include ethylene glycol, propylene glycol and their counterparts with higher degrees of condensation, such as, for example, diethylene glycol, triethylene glycol, dipropylene glycol, tripropylene glycol etc., butanediol, pentanediol, hexanediol, neopentyl glycol, alkoxylated phenolic compounds, such as ethoxylated and/or propoxylated bisphenols, and cyclohexanedimethanol. Further suitable polyols are trifunctional and higher polyfunctional alcohols, such as glycerol, trimethylolpropane, butanetriol, trimethylolethane, pentaerythritol, neopentyl glycol, ditrimethylolpropane, dipentaerythritol, sorbitol, and mannitol.

The above diols or polyols may be alkoxylated, more particularly ethoxylated and propoxylated. The alkoxylation products are obtainable in a known way by reaction of the above alcohols with alkylene oxides, especially ethylene oxide or propylene oxide. The degree of alkoxylation per hydroxyl group is preferably 0 to 20, i.e., 1 mol of hydroxyl group may be alkoxylated preferably with up to 20 mol of alkylene oxides.

The polyesters further comprise dicarboxylic acids or polycarboxylic acids as synthesis components. In the preparation of the polyesters, dicarboxylic acids or polycarboxylic acids may also be used in the form of their reactive derivatives, e.g. as anhydrides or esters. Suitable dicarboxylic acids are succinic acid, glutaric acid, adipic acid, sebacic acid, isophthalic acid, terephthalic acid, their isomers and hydrogenation products, such as tetrahydrophthalic acid. Also contemplated are maleic acid and fumaric acid for unsaturated polyesters.

Polyesters may also comprise monoalcohols or monocarboxylic acids as a constituent; through accompanying use of compounds of this kind it is possible to adjust or limit the molecular weight.

In order for particular properties to be achieved the polyesters may comprise particular functional groups. Water-soluble or water-dispersible polyesters comprise the necessary amount of hydrophilic groups, carboxyl groups or carboxylate groups, for example, to achieve solubility in water or dispersibility in water. Crosslinkable polyesters, for powder coating materials, for example, comprise functional groups, which enter into a crosslinking reaction with the crosslinking agent that is used. These may likewise be carboxylic acid groups, if crosslinking is intended with compounds comprising hydroxyl groups, hydroxyalkylamides, for example. The functional groups may also be ethylenically unsaturated groups, through modification of the polyester with unsaturated dicarboxylic acids (maleic acid) or reaction with (meth)acrylic acid, for example. Polymers of this kind are radiation-curable or crosslinkable chemically or thermally.

Unsaturated polyesters may also be copolymerized with free-radically polymerizable compounds that contain single or else multiple ethylenic unsaturation, such as styrene, $C_1$-$C_{10}$ alkyl acrylates, dialkyl acrylates, e.g., the diacrylate of ethanediol or butanediol. For this purpose, the unsaturated polyester may be used in a mixture with the ethylenically unsaturated monomers, as described in WO 00/23495 and EP 1131372, for example. In this case the above ethylenically unsaturated compounds serve simultaneously as solvents (reactive diluents), and so the mixture is present preferably as a solution of the polyesters in these compounds. The mixture may be used, for example as a coating or impregnating composition, including in particular its use for producing laminates. Curing may take place thermally or photochemically, in both cases also optionally with addition of an initiator.

Further Constituents of the Polyurethanes

Polyurethanes comprise di- or polyisocyanates as an essential synthesis component.

Particular mention is made of diisocyanates X(NCO)2, where X is an aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of diisocyanates of this kind are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis and the cis/trans isomers, and mixtures of these compounds.

Diisocyanates of this kind are available commercially.

Particularly important mixtures of these isocyanates are the mixtures of the respective structural isomers of diisocyanatotoluene and diisocyanatodiphenylmethane; a particularly suitable mixture is that of 80 mol % of 2,4-diisocyanatotoluene and 20 mol % 2,6-diisocyanatotoluene. Also particularly advantageous are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, the preferred mixing ratio of aliphatic to aromatic isocyanates being 4:1 to 1:4.

As diols and/or polyols, which are reacted with the di- or polyisocyanates, the invention uses compounds of the general formula I as pure compounds or as mixtures of compounds of the general formula I or in a mixture with other diols or polyols. As diols and/or polyols it is also possible more particularly to use polymers of the invention. In the case of polyurethanes, it is also preferred to use polyester diols and/or polyester polyols as diols and/or polyols. They are referred to in general below as polyesterols. Such polyesterols are obtained beforehand by reacting diols or polyols with dicarboxylic or polycarboxylic acids (see above description of the polyesters). The compounds of the general formula I or mixtures of compounds of the general formula I may be comprised in the polyurethanes in the form of such polyesterols. Further diols and polyols contemplated are those mentioned above, either as synthesis components which are reacted directly with the di- or polyisocyanates, or as a constituent of the polyesterols. Suitable dicarboxylic acids or polycarboxylic acids for the polyesterols are likewise those mentioned above.

The polyurethanes may also comprise monoalcohols or monoisocyanates as constituents; by accompanying use of such compounds it is possible to adjust or limit the molecular weight.

In order to achieve particular properties, the polyurethanes may comprise particular functional groups. Water-soluble or water-dispersible polyurethanes comprise the necessary amount of hydrophilic groups-carboxyl groups or carboxylate groups, for example—to achieve solubility in water or dispersibility in water. An example of a suitable synthesis component is dimethylolpropionic acid. Crosslinkable polyurethanes comprise functional groups, which enter into a crosslinking reaction with the crosslinking agent that is used. Beside urethane groups, the polyurethanes may more particularly also comprise other functional groups, urea groups, for example, which form through reaction of the di- or polyisocyanates with amino compounds. The polymers may, if desired, be chemically modified—for example, functionalized or crosslinked—by other or further reactions during or else, in particular, at a later point in time, as for example in the course of their use.

In particular the polymers may comprise crosslinking groups which, as soon as the necessary conditions are present, enter into a crosslinking reaction. The polymers may, in particular, also be used in a mixture with crosslinkers which at the desired point in time, and under the necessary conditions (more particularly at an elevated temperature), enter into a crosslinking reaction with the polymer.

According to the reactivity of the crosslinkers, a distinction is made between one-component (1K) and two-component (2K) systems. In the case of 2K systems, the crosslinker is not added until shortly before the subsequent use; in the case of 1K systems, the crosslinker may be added to the system at an early stage (latent crosslinker), with crosslinking occurring only under the conditions that are brought about later on, such as during the removal of solvents and/or during an increase in temperature, for example.

Typical crosslinkers are, for example, isocyanates, epoxides, acid anhydrides or else—in the case of polymers having free-radically polymerizable ethylenically unsaturated groups—ethylenically unsaturated monomers such as styrene.

The Use of the Polymers

The polymers are suitable for use as a constituent of thermoplastic compositions. The polymers, polyesters or polyurethanes, for example, have for this purpose, preferably a sufficiently high molecular weight to give them thermoplastic properties.

Thermoplastic compositions are generally used for producing shaped articles, in which context it is possible to employ customary methods such as injection molding, extrusion or blow molding.

More particularly the polymers are suitable for use as a constituent of coating materials, sealants or adhesives.

The coating materials, sealants or adhesives comprise the polymers of the invention preferably as binders. They may comprise further binders and other additives, examples being antioxidants, stabilizers, dyes, pigments, flow control assistants, thickeners, or wetting assistants.

The coating materials, sealants or adhesives may be aqueous or solventborne materials. Aqueous materials are preferred. Materials of this kind comprise the binders of the invention preferably in the form of solutions or dispersions in water or organic solvents or mixtures thereof. Where necessary, the polymers comprise additional functional groups which produce solubility or dispersibility in water or organic solvents, preferably in water (see above).

The coating materials, sealants or adhesives may also be materials which are largely free of water or organic solvents (known as 100% systems). Materials of this kind generally comprise less than 10 parts by weight of water or other organic solvents (boiling point less than 150° C. at 1 bar), per 100 parts by weight of the materials. With particular preference they comprise less than 2 parts by weight, very preferably less than 1 part by weight, or less than 0.5 part by weight of water or other organic solvents (boiling point less than 150° C. at 1 bar), per 100 parts by weight of the materials.

The materials in question may be materials which are still fluid at room temperature or may be materials which are present in the form, for example, of a powder and which are processed only at elevated temperatures.

The materials, especially coating materials, may be radiation-curable or used as radiation-curable materials or coating materials. For that purpose they preferably comprise a radiation-curable polymer of the invention, more particularly a radiation-curable polyester (see above). The radiation curing may take place with high-energy radiation, electron beams, for example, or UV light; when UV light is used, it is possible with preference to add a photoinitiator to the polymers.

One preferred use in the context of the present invention is the use of the polymers of the invention as or in powder coating materials. As powder coating material it is preferred to use polyesters which are crosslinkable.

In one preferred embodiment the powder coating material is prepared by mixing and melting the polyester, crosslinker and further additives, pigments and flow control agents, for example, at high temperatures. The mixture can be brought into powder form by subsequent extrusion and corresponding processing of the extrudate.

The powder coating material may be coated onto the desired substrates, examples being those with surfaces of metal, plastic or wood, in a conventional manner, including, for example, electrostatically.

The polymers of the invention have a low viscosity, both a low melt viscosity (100% systems) or a low solution viscosity (polymer solutions). The low viscosity allows easy handling, produces good coating properties and permits higher solids fractions in solutions or dispersions or lower binder fractions in pigmented materials. The polymers of the invention are also, in particular highly resistant to hydrolysis.

When used in coating materials, sealants and adhesives, the polymers of the invention produce good mechanical properties; in particular the coating materials, powder coating materials, for example, have high impact toughness, good elasticity and high gloss.

Thus, the present invention also includes a method for preparing a thermoplastic composition, the method comprising combining with a precursor of a thermoplastic composition and the polymer described above.

The present invention also includes a method for producing a coating material, a sealant, or an adhesive, the method comprising combining with a precursor of a coating material and the polymer described above.

The present invention also includes a method for producing a powder coating material, the method comprising combining with a precursor of a powder coating material and the polymer discussed above.

The present invention also includes a method for producing a radiation-curable coating material, the method comprising combining with a precursor of a radiation-curable coating material and the polymer discussed above.

EXAMPLES

Preparation of 2-isopropyl-2-methyl-1,3-propanediol

A 4 l stirring flask with condenser and nitrogen blanketing was charged with crude 2,3-dimethylbutanal product (250 g, 2.5 mol) (88% 2,3-dimethylbutanal and 11% 4-methylpentanal) and formaldehyde (30% in water, 750 g, 7.5 mol) with 120 g of methanol. Over the course of 1.5 h, sodium hydroxide (25% in water, 645 g, 4 mol) was added dropwise and the batch was heated at 50° C. Following the addition of the base, the batch was stirred at 50° C. for a further 30 min and then adjusted to a pH of 7 with formic acid at room temperature. The phases were separated. The aqueous phase contained diol (~12%) and so was extracted with amyl alcohol. The combined organic phases were freed under reduced pressure from methanol and amyl alcohol. The crude distillation of the product took place via a distillation bridge (109-135° C. at 4 mbar). The final distillation was carried out in a packed column (108-106° C. at 4 mbar). The product was obtained in a yield of 92% as a solid with a purity of 98%.

The structure was determined by means of GC, GC-MS and NMR ($^1$H, $^{13}$C).

Preparation of 2-isopropyl-5-methyl-2-hexenal

A 4 l stirring flask with condenser and nitrogen blanketing was charged with 2150 g (25 mol) of isovaleraldehyde with 322 g (15% by weight) of methanol at RT. Over the course of 1 h, sodium hydroxide (25% in water, 600 g, 3.75 mol) was added dropwise with cooling (maximum temperature 60° C.). Following the addition of the base, the batch was stirred at 50° C. for a further 30 min and then adjusted to a pH of 7 with acetic acid at room temperature. The phases were separated. The organic phase (1993 g, 82% yield) contained the following according to GC area %: 5% methanol, 85% 2-isopropyl-5-methyl-2-hexenal, 5% 2-isopropyl-5-methyl-1,3-hexanediol, among others.

Selective hydrogenation of
2-isopropyl-5-methyl-2-hexenal to
2-isopropyl-5-methyl-2-hexanal The organic phase from the aldol condensation (1700 g) was hydrogenated with 1.5% Pd/C (25.5 g, 10% form) in autoclave at 20 bar and 80° C. for 5 h. The composition of the product according to GC area % was as follows: 6% methanol, 1.8% 2-isopropyl-5-methyl-2-hexenal, 70% 2-isopropyl-5-methyl-2-hexanal, 4% 2-isopropyl-5-methyl-2-hexenol, 5% 2-isopropyl-5-methyl-1,3-hexanediol, among others. (Hydrogenation yield: 81%).

Preparation of
2-isopropyl-2-(3-methylbutyl)-1,3-propanediol

A 4 l stirring flask with condenser and nitrogen blanketing was charged with 665 g (70% in 2-isopropyl-5-methyl-2-hexanal) of the hydrogenation product and formaldehyde (30% in water, 900 g, 9 mol) with 583 g of methanol at RT. Over the course of 1.5 h, sodium hydroxide (25% in water, 768 g, 4.8 mol) was added dropwise and the batch was heated at 50° C. Following the addition of the base, the batch was stirred at 50° C. for a further 30 min and then adjusted to a pH of 7 with formic acid at room temperature. The phases were separated. The aqueous phase contained diol (~20%) and so was extracted with amyl alcohol. The combined organic phases were freed under reduced pressure from methanol and amyl alcohol. The crude distillation of the product took place via a distillation bridge (124-165° C. at 2 mbar). The final distillation was carried out in a packed column (liquid-phase temperature 180-178° C., overhead temperature 126-129° C. at 2.5 mbar). The product was obtained in a yield of 69% as a colorless liquid with a purity of 95%.

The structure was determined by means of GC, GC-MS and NMR ($^1$H, $^{13}$C).

Use Examples

Abbreviations

ADA: adipic acid
D: polydispersity index ($M_w/M_n$)
DPG: dipropylene glycol
DBTO: dibutyltin oxide
DSC: differential scanning calorimetry
GPC: gel permeation chromatography
IPA: isophthalic acid
IMBPD: 2-isopropyl-2-(3-methylbutyl)propane-1,3-diol
IMPD: 2-isopropyl-2-methylpropane-1,3-diol
$M_n$: number-average molecular weight in [g/mol]
$M_w$: weight-average molecular weight in [g/mol]
NVC: nonvolatiles content
NPG: neopentyl glycol
OHN: OH number
AN: acid number
$T_g$: glass transition temperature
TMP: trimethylolpropane
TMA: trimellitic anhydride
TPA: terephthalic acid
$\eta_1$: melt viscosity
$\eta_2$: solution viscosity
Polymer Characterization Methods The molecular weight determinations are carried out by GPC. Stationary phase: highly crosslinked porous polystyrene-divinylbenzene, available commercially as PL-GEL from Polymer Laboratories. Mobile phase: THF. Flow rate: 0.3 ml/min. Calibration with polyethylene glycol 28700 to 194 daltons from PSS.

The acid number of the polyesters is determined in accordance with the DIN standard method 53169.

The melt viscosity $\eta_1$ of the polyesters is determined using a cone/plate viscometer at 160° C. in oscillation mode and is carried out with an angular velocity of 0.1 rad/s. The solution viscosity $\eta_2$ of the polyesters is determined using a cone/plate viscometer at room temperature in rotation mode. The solutions consist of 70% polyester and 30% solvent (5/1 mixture of Solvesso 100™/Solvenon PM™).

The Tg of the polyester is determined by means of DSC in accordance with ASTM D3418.

Preparation of Powder Polyesters with COOH Groups
Polyester P1
Stage I—Preparation of the OH-containing Oligomer 150.4 g of IMBPD (0.80 mol), 266.3 g NPG (2.56 mol), 53.6 g TMP (0.40 mol), 531.3 g of TPS (3.20 mol), and 0.7 g of catalyst DBTO are charged to a 2 l four-neck flask fitted with thermometer, inert gas inlet, stirrer and reflux condenser. Under reflux, with a stream of nitrogen being passed through, the mixture of reactants is heated rapidly to 180° C. Water is distilled off continuously. Subsequently the reaction mixture is heated in stages to 230° C. over the course of 3 to 5 h with stirring and with flow of nitrogen, and is stirred further at 230° C. until the oligomer has an AN of 10 to 15 mg KOH/g. The AN of the oligomer is 11 mg KOH/g.

Stage II—Preparation of the COOH-containing Polymer P1

The oligomer synthesized above is cooled to 180° C. and then 132.8 g of IPA (0.80 mol) are added. The temperature is raised to 230° C., and condensation is continued under these conditions until the polymer has an AN of 30 to 40 mg KOH/g. The water formed from the polymerization can be stripped off at the end of the reaction by a gentle vacuum, in order to achieve the desired AN. This gives a branched COOH-containing powder polyester P1, whose AN is 31 mg KOH/g. P1 has a glass transition temperature $T_9$ of 72° C. and a melt viscosity $\eta_1$ of 194 Pa*s at 160° C. The GPC analysis yields the following values: $M_n$=2700 g/mol; D=16 (see Table 1).

Polyesters P2 to P7

The procedure is the same as for the preparation of P1, with the compositions summarized in Table 1. This gives branched COOH-containing powder polyesters, whose characteristic data AN, $M_n$, D, $T_9$ and $\eta_1$ are listed in Table 1.

P2 Comparative Example 2
P3 Example 3
P4 Example 4
P5 Comparative Example 5
P6 Example 6
P7 Comparative Example 7

TABLE 1

| | Composition | | | | | | Characteristic polyester data | | | | |
|---|---|---|---|---|---|---|---|---|---|---|---|
| Poly-ester | IMBPD [g] | IMPD [g] | NPG [g] | TMP [g] | TPA [g] | IPA [g] | AN [mg KOH/g] | $M_n$ [g/mol] | D | $T_g$ [° C.] | $\eta_1$ [Pa*s] |
| P1 | 150.4 | 0 | 266.3 | 53.6 | 531.3 | 132.8 | 31 | 2700 | 16 | 72 | 194 |
| P2 | 0 | 0 | 374.9 | 57.5 | 570.0 | 142.5 | 36 | 2430 | 76 | 76 | 4660 |
| P3 | 0 | 113.1 | 297.2 | 16.6 | 497.9 | 213.4 | 61 | 1530 | 2.8 | 65 | 26.6 |
| P4 | 153.6 | 0 | 283.4 | 15.8 | 474.7 | 203.5 | 56 | 1800 | 2.5 | 68 | 18.9 |
| P5 | 0 | 0 | 396.0 | 17.0 | 510.3 | 218.7 | 57 | 1890 | 3.6 | 69 | 52.7 |
| P6 | 131.8 | 0 | 255.2 | 11.7 | 407.3 | 174.5 | 38 | 2470 | 4.4 | 70 | 51.8 |
| P7 | 0 | 0 | 407.9 | 14.6 | 506.1 | 216.9 | 38 | 2400 | 3.2 | 73 | 53.6 |

The polymers P1, P3, P4 and P6 of the invention have a markedly lower melt viscosity than the corresponding comparative polymers P2, P5 and P7 of comparable AN and $M_n$.

Preparation of Amorphous Polyesters with OH Groups
Polyester P8

155.73 g of IMPD (1.18 mol), 194.68 g of NPG (1.87 mol), 158.09 g of TMP (1.18 mol), 456.97 g of IPA (2.75 mol), 172.25 g of ADA (1.18 mol) and 0.5 g of catalyst DBTO are charged to a 2 l four-neck flask fitted with thermometer, inert gas inlet, stirrer and reflux condenser. Under reflux, with a stream of nitrogen being passed through, the mixture of reactants is heated rapidly to 160° C. Water is distilled off continuously. Subsequently the reaction mixture is heated in stages to 230° C. over the course of 3 to 5 h with stirring and with flow of nitrogen, and is stirred further at 230° C. until the polyester P8 has an AN of 10 to 15 mg KOH/g. This gives a branched, amorphous OH-containing polyester P8, whose AN is 12 mg KOH/g. P8 has an OHN of 100 mg KOH/g and a glass transition temperature $T_g$ of 26° C. GPC analysis yields the following values: $M_n$=2000 g/mol; D=7.4. P8 has a melt viscosity $\eta_1$ of 2.9 Pa*s at 160° C. The solution viscosity $\eta_2$ of the polyester P8 at room temperature (P8 solution of 70% NVC and a 5/1 mixture of Solvesso 100™/Solvenon PM™ as solvent) is 29.8 Pa*s (see Table 2).

Polyesters P9 and P10

The same procedure is carried out as for the preparation of P8, with the composition summarized in Table 2. The characteristic data of the polyesters P9 and P10 are listed in Table 2.

P9 Example with IMBPD
P10 Comparative Example with NPG Only reaction mixture has an AN of 10 to 15 mg KOH/g. The AN of the oligomer is 14 mg KOH/g.

Stage II—Preparation of Polymer P11

The oligomer synthesized above is cooled to 160° C. and then 155.0 g of TMSA (0.81 mol) are added. The temperature is raised to 230° C., and condensation is continued under these conditions until the polymer has an AN of 42 to 48 mg KOH/g. The water formed from the polymerization can be stripped off at the end of the reaction by a gentle vacuum, in order to achieve the desired AN. This gives a linear, water-dilutable polyester P11, whose AN is 45 mg KOH/g. P11 has a glass transition temperature $T_g$ of 48° C. and a melt viscosity $\eta_1$ of 3.0 Pa*s at 160° C. GPC analysis yields the following values: $M_n$=1180 g/mol; D=2.1 (see Table 3).

Assessment of Resistance of P11 to Hydrolysis

A 20% strength aqueous colloidal solution of P11 is prepared, brought to a pH of 8 using N,N-dimethylethanolamine and stored at 45° C. The time taken for the colloidal solution to undergo precipitation is taken as a measure of the resistance of the polyester to hydrolysis (see Table 4).

Polyesters P12 and P13

The procedure is the same as for the preparation of P11, with the composition summarized in Table 3. The characteristic data of the polyesters P12 and P13 are listed in Table 3.

TABLE 2

| | Composition | | | | | | Characteristic polyester data | | | | | | |
|---|---|---|---|---|---|---|---|---|---|---|---|---|---|
| Polyester | IMBPD [g] | IMPD [g] | NPG [g] | TMP [g] | IPA [g] | ADA [g] | AN [mg KOH/g] | OHN [mg KOH/g] | $M_n$ [g/mol] | D | $T_g$ [° C.] | $\eta_1$ [Pa*s] | $\eta_2$ [Pa*s] |
| P8 | 0 | 155.73 | 194.68 | 158.09 | 456.97 | 172.25 | 12 | 100 | 2000 | 7.4 | 26 | 2.9 | 29.8 |
| P9 | 208 | 0 | 182.57 | 148.26 | 428.55 | 161.54 | 12 | 100 | 2100 | 6.9 | 22 | 2.7 | 19.8 |
| P10 | 0 | 0 | 326.6 | 163.9 | 473.9 | 178.6 | 15 | 108 | 2195 | 17 | 25 | 6.3 | 41.6 |

The polymers P8 and P9 of the invention have a markedly lower melt viscosity and a markedly lower solution viscosity than the comparative polymer P10.

P12 Example with IMBPD
P13 Comparative Example with NPG Only

TABLE 3

| | Composition | | | | | Characteristic polyester data | | | | | |
|---|---|---|---|---|---|---|---|---|---|---|---|
| Polyester | IMPD [g] | IMBPD [g] | NPG [g] | IPA [g] | TMA [g] | AN [mg KOH/g] | OHN [mg KOH/g] | $M_n$ [g/mol] | D | $T_g$ [° C.] | $\eta_1$ [Pa*s] |
| P11 | 170.5 | 0 | 302.2 | 401.9 | 155.0 | 45 | 92 | 1180 | 2.1 | 48 | 3.0 |
| P12 | 0 | 242.8 | 302.2 | 40.19 | 155.0 | 45 | 90 | 1150 | 2.0 | 44 | 2.5 |
| P13 | 0 | 0 | 490.4 | 451.6 | 174.1 | 47 | 105 | 1250 | 2.3 | 51 | 3.7 |

The polymers P11 and P12 of the invention have a markedly lower melt viscosity than the comparative polymer P13.

Preparation of Water-Dilutable Polyesters
Polyester P11
Stage I—Preparation of the OH-containing Oligomer 170.5 g of IMPD (1.29 mol), 302.2 g of NPG (2.91 mol), 401.9 g of IPA (2.42 mol) and 0.5 g of catalyst DBTO are charged to a 2 l four-neck flask fitted with thermometer, inert gas inlet, stirrer and reflux condenser. Under reflux, with a stream of nitrogen being passed through, the mixture of reactants is heated rapidly to 160° C. Water is distilled off continuously. Subsequently the reaction mixture is heated in stages to 220° C. over the course of 3 to 5 h with stirring and with flow of nitrogen, and is stirred further at 220° C. until the

TABLE 4

The polymers P11 and P12 of the invention are more resistant to hydrolysis than the comparative polymer P13.

| Polyester | Time to precipitation of the aqueous solution (days) |
|---|---|
| P11 | 25 days |
| P12 | 30 days |
| P13 | 17 days |

Preparation of Powder Coating Materials

The reference binder (REF) is the polyester resin Uralac P-862 ($T_g$ 58.0° C., AN 35 mg KOH/g) from DSM Resins B.V. For preparing the powder coating materials PL3, PL4, PL5, PL6, PL7 and PLR, correspondingly, 570.0 g of powder polyester P3, P4, P5, P6, P7 or REF are mixed with 30.0 g of commercial curing agent Primid® XL-552 (hydroxyalkylamide from EMS), 300.0 g of titanium dioxide pigment Kronos® 2160 (Kronos), 9.0 g of flow control agent Resiflow® PV5 (Worlée Chemie GmbH) and 2.5 g of benzoin in a universal laboratory mixer (MIT Mischtechnik GmbH), and the mixture is melted and then extruded at 80-100° C. in a twin-screw extruder (MP 19, APV). The extrudate obtained is then coarsely crushed, ground and screened. The resulting powder coating materials PL3, PL4, PL5, PL6, PL7 and PLR are subjected to the following tests:

| Test parameters | Test method |
| --- | --- |
| Flow properties | Fluidizability DIN ISO 8130-5 |
| | Tableting DIN ISO 8130-11 |
| Gel time | DIN ISO8130-6 |

Subsequently the powder coating materials are applied electrostatically to steel test panels (Q-Panel R-36) and baked at 160° C. for 15 minutes. The target film thicknesses are from 60 μm to 80 μm. The resulting coatings are subjected to the following tests:

| Test parameters | Test method |
| --- | --- |
| Appearance | Visual elevation of surfaces |
| Yellowness index $Y_i$ | Spectrocolor colorimeter (Hach Lange GmbH) |
| Gloss | DIN EN ISO 2813 |
| Impact toughness | EN ISO 6272 |
| Impact sensitivity | ASTM D 2794 |
| Elasticity | EN ISO 1520 |
| Weather stability | Accelerated weathering (QUV-A) DIN EN ISO 11507 |

The results of the coatings tests are summarized in Tables 5 and 6.

TABLE 5

| | Test parameters | Test method | PL3 | PL4 | PL5 | PLR |
| --- | --- | --- | --- | --- | --- | --- |
| Powder coating material | Flow properties | Fluidizability | 164.0 | 129.8 | 160.4 | 124.6 |
| | | Tableting at 180° C. [mm] | 17.5 | 23.5 | 13.5 | 30.5 |
| | Gel time | Gel time at 180° C. [s] | 210 | 174 | 154 | 173 |
| Metal test panels | Appearance | Visual evaluation | 2* | 0*** | 2* | 2* |
| | Yellowing | Measurement of yellow index $Y_i$ | 2.5 | 4.0 | 4.5 | 2.2 |
| | Gloss | Gloss measurement at 20° | 74 | 87 | 75 | 63 |
| | Impact toughness | Reverse impact [kg*cm] | 10 | 40 | 50 | 200 |
| | Impact sensitivity | Impact [kg*cm] | 50 | 200 | 80 | 200 |
| | Elasticity | Erichsen cupping [mm] | 3.4 | 10.3 | 10.1 | 10.6 |
| | Weather stability | Residual gloss after 1000 h QUV-A [%] | 78 | 72 | 84 | 88 |

°3 = severe orange peel
*2 = orange peel, pinholes
**1 = orange peel, a few pinholes
***0 = orange peel, no pinholes The powder coating materials of the invention have very good use properties. PL3 has a lesser tendency toward yellowing than PL5; PL4 has high gloss and achieves better mechanical properties than PL5.

TABLE 6

| | Test parameters | Test method | PL6 | PL7 | PLR |
| --- | --- | --- | --- | --- |  --- |
| Powder coating material | Flow properties | Fluidizability | 154.7 | 147.0 | 124.6 |
| | | Tableting at 180° C. [mm] | 16.5 | 20.5 | 30.5 |
| | Gel time | Gel time at 180° C. [s] | 190 | 150 | 173 |
| Metal test panels | Appearance | Visual evaluation | 0 | 3° | 2* |
| | Yellowing | Measurement of yellow index $Y_i$ | 2.33 | 4.5 | 2.2 |
| | Gloss | Gloss measurement at 20° | 75 | 80 | 63 |
| | Impact toughness | Reverse impact [kg * cm] | 10 | 10 | 200 |
| | Impact sensitivity | Impact [kg * cm] | 70 | 170 | 200 |
| | Elasticity | Erichsen cupping [mm] | 10.3 | 10.3 | 10.6 |
| | Weather stability | Residual gloss after 1000 h QUV-A [%] | | 93.7 | 88 |

°3 = severe orange peel
*2 = orange peel, pinholes
**1 = orange peel, a few pinholes
*** 0 = orange peel, no pinholes The powder coating material PL6 of the invention has good use properties, advantageously with respect to PL7 in terms of yellowing and appearance.

Preparation of High-solids 1-component (1K) Coating Materials

To prepare the high-solids 1K coating materials 1K-PL8, 1K-PL9 and 1K-PL10, 70% strength solutions of the polyesters P8, P9 and P10 in butyl acetate are prepared accordingly. 80 g of each of the 70% strength polyester solutions are mixed with 14 g of commercial curing agent Luwipal® 066 (melamine condensate from BASF), 4 g of n-butanol and 2 g of p-toluene sulfonic acid catalyst. The resulting solutions (NVC 70%) are applied to glass plates and steel test panels using a bar coater. The aim is for film thicknesses of 40 μm to 50 μm. Thereafter the coated test panels are baked at 140° C. for 30 minutes. The resultant coatings are subjected to the following tests:

|  | Test parameter | Test method |
|---|---|---|
| Glass plates | Appearance | visual assessment of surfaces |
|  | Gloss | DIN EN ISO 2813 |
|  | Impact sensitivity | DIN 53157 |
| Steel test panels | Impact sensitivity | DIN 53157 |
|  | Elasticity | DIN 53156 |
|  | Hydrolysis resistance | Daimler-Chrysler Test PBODCC371 |
|  | Chemical resistance | Daimler-Chrysler Test PBODCC371 |

The results of the coatings tests are summarized in Table 7. 1K-PL8 and 1K-PL9 are inventive, 1K-PL10 serves as a comparative example.

TABLE 7

|  | Test parameter | Test method | 1K-PL8 | 1K-PL9 | 1K-PL10 |
|---|---|---|---|---|---|
| Glass plates | Appearance | visual assessment | clear | clear | clear |
|  | Gloss | gloss measurement at 20° | 166 | 166 | 175 |
|  | Impact sensitivity | pendulum damping (König) [sec.] | 231 | 229 | 232 |
|  |  | pendulum damping [swings] | 171 | 170 | 166 |
| Steel test panels | Impact sensitivity | pendulum damping (König) [sec.] | 230 | 236 | 2271 |
|  | Elasticity | pendulum damping [swings] | 171 | 169 | 64 |
|  | Hydrolysis resistance | Erichsen cupping [mm] | 9.1 | 9.3 | 8.3 |
|  | Chemical resistance | $T_{max}$ [° C.] - distilled water | 68 | 69 | 78 |
|  |  | $T_{max}$ [° C.] - Pancreatin in water (50%) | 49 | 42 | 60 |
|  |  | $T_{max}$ [° C.] - sulfuric acid (1%) | 41 | 44 | 39 |
|  |  | $T_{max}$ [° C.] - sodium hydroxide solution (1%) | 45 | 43 | 53 |

The high-solids coating materials 1K-PL8 and 1K-PL9 of the invention exhibit a very good profile of properties. In particular, IMPD and IMBPD display an advantage relative to NPG in terms of the mechanical properties of the film, and also in acid resistance.

Preparation of High-solids 2-component (2K) Coating Materials

To prepare the high-solids 2K coating materials 2K-PL8, 2K-PL9 and 2K-PL10, 70% strength solutions of the polyesters P8, P9 and P10 in butyl acetate are prepared accordingly. 70 g of each of the 70% strength polyester solutions are mixed with 1 g of solution (10% strength in butyl acetate) of the flow control agent Baysilon® OL17 (polyether from Borchers GmbH), 1 g of dibutylin dilaurate solution catalyst (5% strength in butyl acetate), 3 g of methoxypropyl acetate, 20 g of commercial curing agent Basonat® HI 190 BS (90% form, polyisocyanate from BASF) and 5 g of butyl acetate. The resulting solutions (NVC 67%) are applied to glass plates and steel test panels using a bar coater. The aim is for film thicknesses of 40 μm to 50 μm. Thereafter the coated test panels are baked at 80° C. for 30 minutes. The resultant coatings are subjected to the following tests:

|  | Test parameter | Test method |
|---|---|---|
| Glass plates | Appearance | visual assessment of surfaces |
|  | Gloss | DIN EN ISO 2813 |
|  | Impact sensitivity | DIN 53157 |
| Steel test panels | Impact sensitivity | DIN 53157 |
|  | Elasticity | DIN 53156 |
|  | Hydrolysis resistance | Daimler-Chrysler Test PBODCC371 |

-continued

| Test parameter | Test method |
|---|---|
| Chemical resistance | Daimler-Chrysler Test PBODCC371 |

TABLE 8

| | Test parameter | Test method | 2K-PL8 | 2K-PL9 | 2K-PL10 |
|---|---|---|---|---|---|
| Glass plates | Appearance | visual assessment | clear | clear | clear |
| | Gloss | gloss measurement at 20° | 164 | 165 | 166 |
| | Impact sensitivity | pendulum damping (König) [sec.] | 201 | 199 | 186 |
| | | pendulum damping [swings] | 145 | 142 | 134 |
| Steel test panels | Impact sensitivity | pendulum damping (König) [sec.] | 206 | 204 | 186 |
| | Elasticity | pendulum damping [swings] | 147 | 146 | 133 |
| | Hydrolysis resistance | Erichsen cupping [mm] | 10.5 | 10.4 | 10.3 |
| | | $T_{max}$ [° C.] - distilled water | 67 | 73 | 55 |
| | Chemical resistance | $T_{max}$ [° C.] - Pancreatin in water (50%) | 39 | 39 | 39 |
| | | $T_{max}$ [° C.] - sulfuric acid (1%) | 49 | 49 | 50 |
| | | $T_{max}$ [° C.] - sodium hydroxide solution (1%) | 46 | 45 | 52 |

The high-solids coating materials 2K-PL8 and 2K-PL9 of the invention exhibit a very good profile of properties. The mechanical properties and the hydrolysis resistance are markedly better than in the case of the coating material 2K-PL10 which is based on NPG only.

The invention claimed is:

1. A polycarbonatediol polymer obtained by polycondensation from at least one dialkyl carbonate or cyclic carbonate and at least one diol comprising at least one 2-isopropyl-2-alkyl-1,3-propanediol of the formula I:

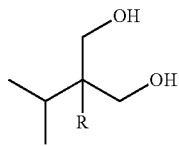

or at least one alkoxylated derivative thereof,
wherein R is a linear or branched alkyl group having 1 to 10 C atoms, with the elimination of alcohols.

2. The polymer according to claim 1, wherein R is methyl and/or 3-methylbutyl.

3. The polymer according to claim 2, wherein the compound of the formula I is obtained by reacting 3-methyl-2-alkylbutanal with formaldehyde in an aldol-Cannizarro reaction or by aldol reaction and subsequent hydrogenation.

4. A method for preparing a thermoplastic composition, the method comprising combining with a precursor of a thermoplastic composition and the polymer according to claim 1.

5. A thermoplastic composition comprising the polymer and/or repeat units of the polymer according to claim 1.

6. A shaped article, comprising the thermoplastic composition according to claim 5.

7. A method for producing a coating material, a sealant, or an adhesive, the method comprising combining with a precursor of a coating material and the polymer according to claim 1.

8. A coating material, a sealant or an adhesive comprising repeat units of the polymer according to claim 1.

9. The coating material, sealant or adhesive according to claim 8, wherein the coating material, the sealant, or the adhesive is an aqueous material.

10. A method for producing a powder coating material, the method comprising combining with a precursor of a powder coating material and the polymer according to claim 1.

11. A powder coating material comprising repeat units of the polymer according to claim 1.

12. A method for producing a radiation-curable coating material, the method comprising combining with a precursor of a radiation-curable coating material and the polymer according to claim 1.

13. A radiation-curable coating material comprising repeat units of the polymer according to claim 1.

* * * * *